C. P. BYRNES.
WIND SHIELD.
APPLICATION FILED APR. 18, 1913.

1,171,835.

Patented Feb. 15, 1916.
2 SHEETS—SHEET 1.

WITNESSES
R A Balderson

INVENTOR
C P Byrnes

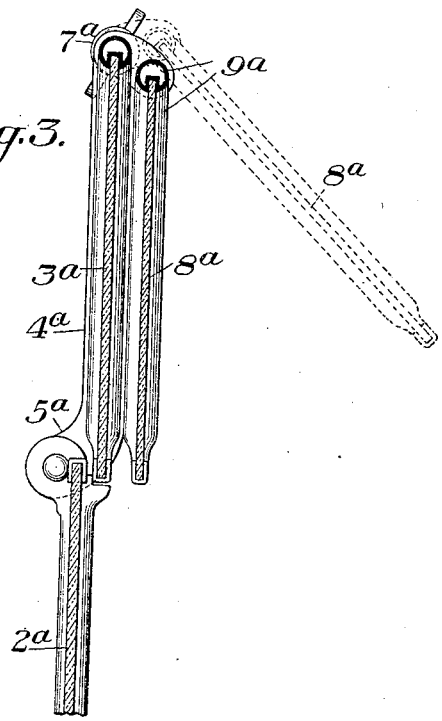
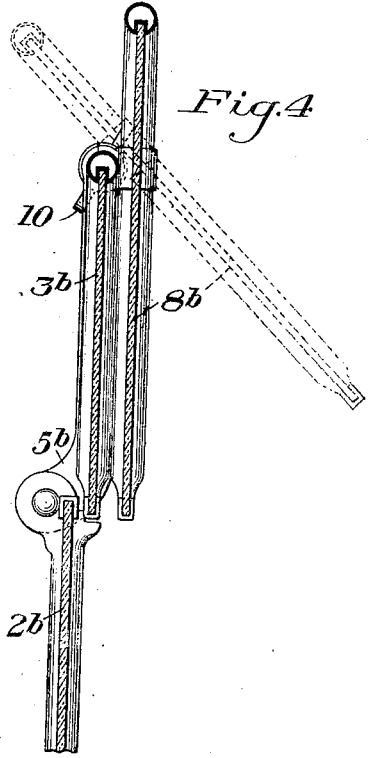
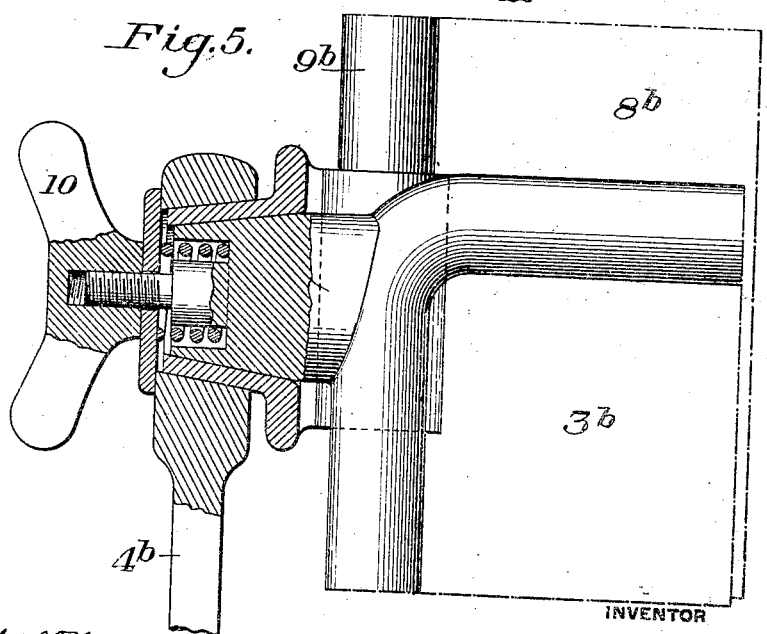

UNITED STATES PATENT OFFICE.

CLARENCE P. BYRNES, OF SEWICKLEY, PENNSYLVANIA.

WIND-SHIELD.

1,171,835.

Specification of Letters Patent.   Patented Feb. 15, 1916.

Application filed April 18, 1913.   Serial No. 761,968.

*To all whom it may concern:*

Be it known that I, CLARENCE P. BYRNES, a citizen of the United States, residing at Sewickley, in the county of Allegheny and State of Pennsylvania, have invented a new and useful Wind-Shield, of which the following is a full, clear and exact description, reference being had to the accompanying drawings, forming part of this specification, in which—

Figure 1:
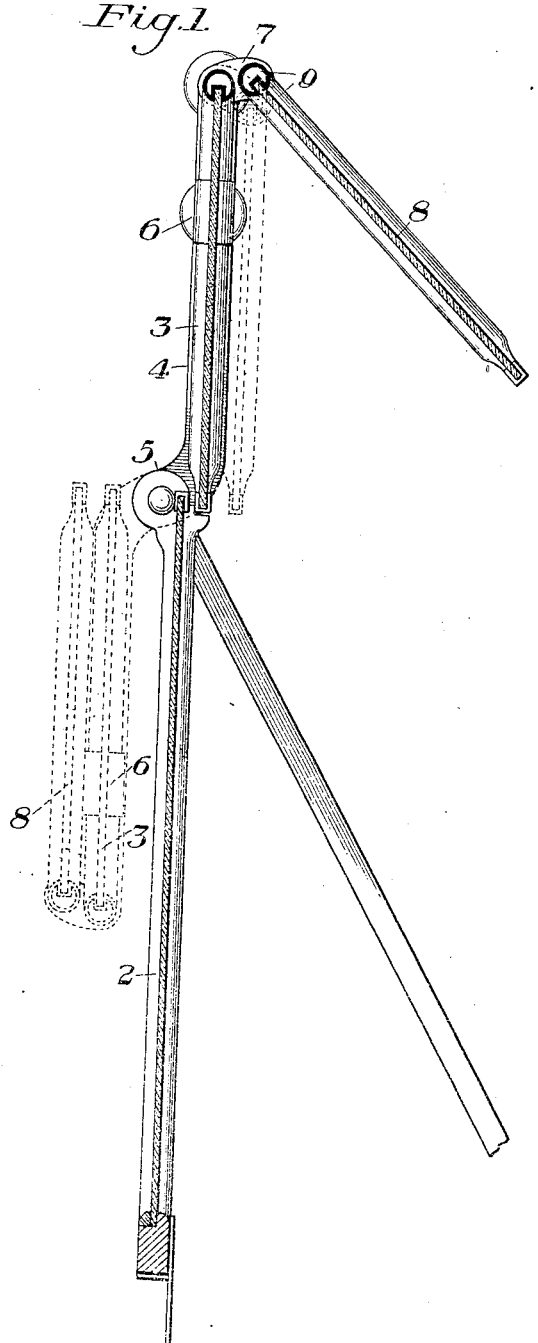
Figure 2:
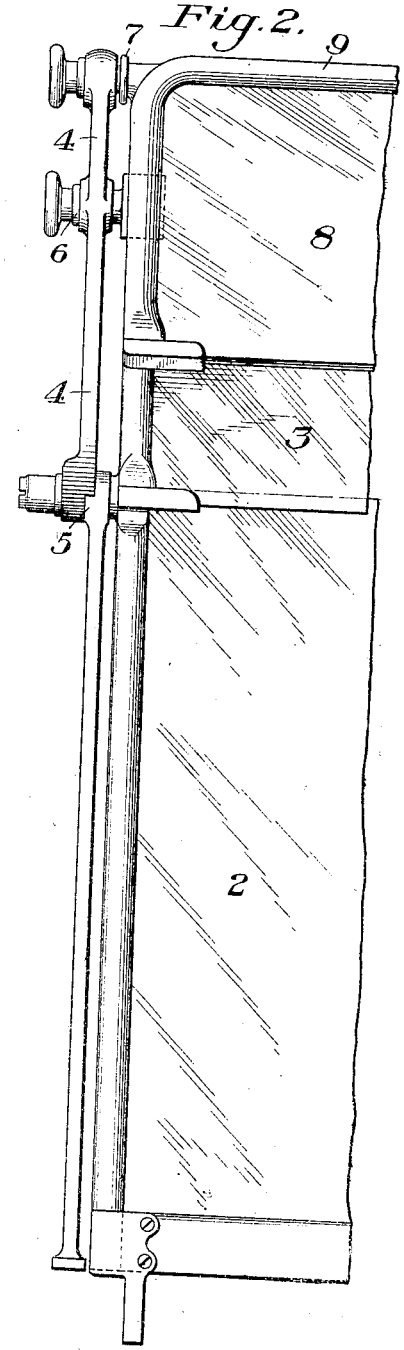

Figure 1 is a vertical transverse section showing one form of wind shield constructed in accordance with my invention. Fig. 2 is a partial front elevation of the same. Figs. 3 and 4 are views similar to Fig. 1, showing the upper portions of modified forms, and Fig. 5 is a sectional detail view showing a form of clamp which may be used.

My invention relates to wind shields for automobile use and is designed to provide a combined wind shield and rain shield which will allow ventilation when desired between the panels of the wind shield proper.

In the drawings, referring to the form of Figs. 1 and 2, 2 represents the lower stationary panel and 3 the upper swinging panel of a wind shield of ordinary type. The side supports 4 for the upper panel are pivoted to the lower panel at 5 and the upper panel is in turn pivoted to the supports 4 at the point 6. The upper panel may thus be swung up and downwardly behind the lower panel and may also be tilted forwardly on its end supports.

At the upper ends of the support 4, I pivot forward extensions 7 which support the angular rain shield panel 8. The supporting frame 9 of this panel preferably extends around the top and sides but leaves the lower edge of the glass free for the major portion of its length. This rain shield panel, as herein shown, may be tilted into different positions and when tilted to an angular position, such as shown at Fig. 1, its lower edge is slightly above the line of vision of the driver who can look forward below this lower edge, and above the line of juncture between the upper and lower panels 2 and 3. At the same time opportunity is afforded for tilting the upper panel 3 upwardly and forwardly to allow air entrance to any extent desired. The upper panel and the rain panel may also be swung back on their common supports into position shown in dotted lines in Fig. 1, thus giving the driver clear vision above the entire shield.

In Fig. 3, I show a form similar to that of Figs. 1 and 2, except that the upper panel 3ª and the rain shield panel 8ª are pivotally mounted at the same points or on the same pivot for swinging. In this figure, parts similar to those of Figs. 1 and 2 are marked with similar numerals with the letter "a" applied.

In Fig. 4 I show a form similar to that of Fig. 3, except that the rain shield panel 8ᵇ is extended upwardly beyond the common pivoting level so that its upper portion tilts backwardly when its lower portion is swung into the rain shield position. In this form the pivot clamp is preferably that shown in Fig. 5, which may also be used for clamping the upper panels in any of the forms shown. In this figure 10 is the clamping handle which acts through the screw connection to clamp the adjustment. In these figures, parts similar to those of Fig. 1 are designated by similar numerals with the letter "b" applied.

The advantages of my invention result from combining with a wind shield, having a movable transparent panel, a rain shield panel coacting therewith to protect the line of vision through the upper wind shield panel when desired.

Changes may be made in the form of the wind shield, panel etc., without departing from my invention.

I claim.

1. A complete wind shield having a plurality of separate panels, the upper panel being transparent and arranged so that the driver's line of vision passes through it when the panels are in closed position, said wind shield being adapted to protect the driver against rain when in said vertical position, at least one of said panels being movable relative to the other to allow passage of an air current between their adjacent portions, in combination with an additional rain shield panel of rigid translucent material arranged to be supported in an outwardly and downwardly inclined position in front of the upper wind shield panel with its lower outer free edge positioned above the lower edge of the upper panel to allow the driver's line of vision to pass through the upper wind shield panel below the edge of the rain panel, the rain panel acting in this position to protect from rain or snow that portion of the wind shield panel through which the line of vision passes; substantially as described.

2. A complete wind shield having a plurality of separate panels, said panels when in vertical position constituting a substantial closure for the front for the driver to keep out of the rain, etc., the upper panel being transparent and located so that the driver's line of vision passes through it, said upper transparent panel being provided with upper pivots to allow its lower edge to swing apart from the next panel to admit air between them, in combination with an additional rain shield panel of rigid translucent material arranged to be supported in an outwardly and downwardly inclined position in front of the swinging wind shield panel with its lower outer free edge positioned above the lower edge of the swinging wind shield panel to allow the driver's line of vision to pass through the swinging wind shield panel below the edge of the rain panel, the rain panel acting in this position to protect from rain or snow that portion of the swinging panel through which the line of vision passes; substantially as described.

3. A complete wind shield comprising a lower panel, and an upper transparent panel through which the line of vision passes, at least one of said panels being movable relatively to the other to allow passage of an air current between their adjacent portions, in combination with an additional rain shield panel of rigid material arranged to be supported in an outwardly and downwardly inclined position in front of the upper wind shield panel with its lower outer free edge positioned above the lower edge of the upper panel to allow the driver's line of vision to pass through the upper wind shield panel below the edge of the rain panel, and means for adjusting the rain shield panel to different angular positions relative to the upper wind shield panel, the rain panel acting in this position to protect from rain or snow that portion of the wind shield panel through which the line of vision passes; substantially as described.

4. A complete wind shield having a plurality of panels, the uppermost panel being transparent and arranged so that the line of vision passes through it, said upper transparent panel being pivoted to allow its lower portion to swing apart from the next panel and admit air between them, these parts when in vertical position closing in the front of the machine, in combination with an additional angular rain shield panel of rigid translucent material arranged to be supported in an outwardly and downwardly inclined position in front of the swinging wind shield panel with its lower outer free edge positioned above the lower edge of the swinging wind shield panel to allow the driver's line of vision to pass through the swinging wind shield panel below the edge of the rain panel, and means for adjusting the rain panel to different angular positions relative to the upper wind shield panel, the rain shield panel when in operative position acting to protect from rain or snow that portion of the swinging panel through which the line of vision passes; substantially as described.

In testimony whereof, I have hereunto set my hand.

CLARENCE P. BYRNES.

Witnesses:
L. H. JOHNSON,
H. M. CORWIN.